United States Patent
Tarissan (10) Patent No.: US 10,837,585 B2
(45) Date of Patent: Nov. 17, 2020

(54) CONNECTION SYSTEM FOR CONNECTING TO DEVICES WITH FLUID CONNECTION BETWEEN THE TWO DEVICES

(71) Applicant: PARKER HANNIFIN MANUFACTURING FRANCE SAS, Ville-la-Grand (FR)

(72) Inventor: Fabrice Tarissan, Villaz (FR)

(73) Assignee: PARKER HANNIFIN MANUFACTURING FRANCE SAS, Ville-la-Grand (FR)

( * ) Notice: Subject to any disclaimer, the term of this patent is extended or adjusted under 35 U.S.C. 154(b) by 171 days.

(21) Appl. No.: 15/314,269

(22) PCT Filed: May 20, 2015

(86) PCT No.: PCT/FR2015/051331
§ 371 (c)(1),
(2) Date: Nov. 28, 2016

(87) PCT Pub. No.: WO2015/181473
PCT Pub. Date: Dec. 3, 2015

(65) Prior Publication Data
US 2017/0198849 A1 Jul. 13, 2017

(30) Foreign Application Priority Data

May 28, 2014 (FR) .................................. 14 54879

(51) Int. Cl.
*F16L 37/23* (2006.01)
*B29C 49/48* (2006.01)
*F16L 37/62* (2006.01)

(52) U.S. Cl.
CPC .............. *F16L 37/23* (2013.01); *B29C 49/48* (2013.01); *F16L 37/62* (2013.01);
(Continued)

(58) Field of Classification Search
CPC .................................. F16L 37/23; F16L 37/62
See application file for complete search history.

(56) References Cited

U.S. PATENT DOCUMENTS 4,429,713 A * 2/1984 Walter .................... F16L 37/23
137/614.03
4,592,387 A * 6/1986 Rogers .................... F16L 37/23
137/614.05
(Continued)

FOREIGN PATENT DOCUMENTS

DE 102015222639 A1 * 5/2017 ............. F16L 37/62
GB 2 347 171 A 8/2000
(Continued)

OTHER PUBLICATIONS

International Search Report and Written Opinion for corresponding Patent Application No. PCT/FR2015/051331 dated Aug. 17, 2015.
(Continued)

*Primary Examiner* — David Bochna
(74) *Attorney, Agent, or Firm* — Renner, Otto, Boisselle & Sklar, LLP (57) ABSTRACT

A system comprising a male part, a female part, a driving piece having a spool portion provided with a radial bore, a driving member moving radially inside the radial bore, a cavity and a radial projection. The driving piece moves in translation between a disconnected position of the male and female parts and a connected position of the male and female parts. The driving piece comprises a piston sliding in an activation chamber under the effect of a pressing force. The piston is attached to the spool portion in such a way as to move the drive piece to one of the positions from the connection position and disconnection position under the effect of the pressing force. The system further includes a control unit for triggering the application of the pressing force on the piston.

15 Claims, 7 Drawing Sheets

(52) U.S. Cl.
CPC .. *B29C 49/4823* (2013.01); *B29C 2049/4858* (2013.01); *B29C 2049/4889* (2013.01); *B29C 2049/4892* (2013.01)

(56) References Cited

U.S. PATENT DOCUMENTS

| | | | |
|---|---|---|---|
| 4,679,956 A | | 7/1987 | Douglas et al. |
| 4,863,314 A | * | 9/1989 | Baugh ............... F16L 37/62 |
| | | | 405/191 |
| 4,889,149 A | * | 12/1989 | Weaver ............... F16L 37/23 |
| | | | 137/1 |
| 5,211,501 A | | 5/1993 | Nakamura et al. |
| 6,217,080 B1 | | 4/2001 | Imai |
| 6,776,187 B1 | * | 8/2004 | Marquis ............... F16L 37/23 |
| | | | 137/614.03 |
| 2005/0271763 A1 | | 12/2005 | Jachimski |
| 2009/0014184 A1 | * | 1/2009 | Voss ............... F16L 37/62 |
| | | | 166/345 |
| 2016/0290543 A1 | * | 10/2016 | Gatti ............... F16L 37/23 |
| 2016/0376863 A1 | * | 12/2016 | Older ............... F16L 37/62 |
| | | | 166/368 |

FOREIGN PATENT DOCUMENTS

| | | | |
|---|---|---|---|
| JP | S56-94313 U | | 7/1981 |
| JP | S62-39087 U | | 3/1987 |
| JP | 2000-018458 A | | 1/2000 |
| JP | 2014185773 A | * | 10/2014 ............. F16L 37/23 |
| WO | 2008/000938 A2 | | 1/2008 |

OTHER PUBLICATIONS

Japanese Notice of Reasons for Refusal for corresponding Japanese Patent Application No. 2017-514980 dated Apr. 9, 2019.
European Search Report for corresponding European Patent Application No. 19 20 9247 dated Dec. 19, 2019.

* cited by examiner

CONNECTION SYSTEM FOR CONNECTING TO DEVICES WITH FLUID CONNECTION BETWEEN THE TWO DEVICES

The present invention concerns a connection system, enabling a connection with fluid transport between two devices.

BACKGROUND

A connection system conventionally comprises a male portion, intended to be joined up to a first device, and a female portion, intended to be joined up to a second device.

The male portion and the female portion are intended to be connected to each other, with the possibility of fluid transport between these two portions, in order to enable a fluidic communication between the devices to which the male and female portions are joined up.

In order to enable the interchangeability of the connected devices, a removable connection is provided between the male portion and the female portion.

If appropriate, the operation of disconnection and connection of the male and female portions may be frequently repeated.

Hence, in order to optimize the production time, the operation of disconnection and connection between the male portion and the female portion should be as easy and quick as possible.

Still, this disconnection and connection operation is most often carried out manually, and therefore requires a human effort likely to slow it down. Hence, it is necessary to limit this human effort in order to reduce the duration of the disconnection and connection operation.

Moreover, the connection between the male portion and the female portion should be as secure as possible in order to avoid pernicious effects on the productivity and on the safety of the personnel around.

SUMMARY OF THE INVENTION

Therefore, the present invention aims to overcome all or part of these drawbacks by proposing a connection system offering a rapid and secure disconnection and connection of a male portion and a female portion of this connection system.

To this end, an object of the present invention is a connection system for connecting two devices with a fluidic communication between the two devices, the connection system comprising a male portion which may be joined up to a first device among the two devices, in particular a bottom of a mold for vessels, and a female portion, which may be joined up to a second device among the two devices, in particular a saddle, a drive-piece presenting a drawer portion fitted with a radial bore, and a drive member radially movable inside the radial bore, a cavity, arranged on one of the portions among the male portion and the female portion, and a radial protrusion, arranged on the other one of the portions among the male portion and the female portion, the radial protrusion being designed so as to clear out the drive member in the cavity during a translation of the drive-piece, in order to bring the drive member to bear against a sidewall of the cavity, the drive-piece being movable in translation along a direction substantially parallel to an axis of insertion of the male portion in the female portion, between a disconnection position in which the drive member bears against a first side of the radial protrusion and at a distance from the cavity so as to enable the disconnection of the male portion and the female portion, and a connection position in which the drive member bears against a second side of the radial protrusion and bears simultaneously against a sidewall of the cavity in order to block the male portion in the female portion, and wherein the drive-piece comprises a piston designed so as to slide in an actuation chamber of the connection system under the effect of a pressure force exerted by a fluid on said piston, the piston being fastened to the drawer portion so as to displace the drive-piece towards one of the positions among the connection position and the disconnection position under the effect of said pressure force, the connection system further comprising a control unit for triggering the application of said pressure force on the piston.

Thus, thanks to the piston driving the other parts, including the male portion, and selectively subjected to a pressure force, the connection system according to the invention offers an automatic connection or disconnection, so that the human effort is limited, and is even null. Consequently, this increases the rapidity of execution of the operation of disconnection and connection of the male portion and the female portion, as well as its repeatability.

In addition, the simultaneous pressure of the drive member against the cavity and the radial protrusion in the connection position allows a secure locking of the male portion inside the female portion, since only a displacement of the drive-piece, in particular the piston, from the connection position towards the disconnection position can release the male portion from the female portion.

According to a preferred embodiment, the connection system comprises a return elemnt designed so as to return the drive-piece towards one of the positions among the connection position and the disconnection position, so that the translation of the drive-piece under the action of said return force causes a simultaneous displacement of the male portion relative to the female portion.

The return element allows carrying out the connection or the disconnection of the male portion and the female portion while also limiting the human effort. An advantage of the use of the return element to displace the drive-piece in one of the two positions among the connection and the disconnection position, whereas the piston and the pressure force are used to displace the drive-piece in the other one of these two positions, lies in that a supply of energy is not necessary for one of these two positions, namely when the piston is pressurized. The return element stores energy when the piston is pressurized, which advantageously reduces the duration of a connection-disconnection cycle, the return element then automatically restituting this energy during the reverse operation of connection or, if appropriate, of disconnection. Furthermore, the return element ensures the repeatability of the relative positioning of the male and female portions along the axis of insertion of the male portion in the female portion, by catching up the clearance of the drive-piece.

According to one embodiment, the return element comprises a spring adapted to return the drive-piece in the connection position.

According to an advantageous embodiment, the connection system comprises a blocking unit designed so as to block the drive-piece in one of the positions, among the connection position and the disconnection position, other than that in which the drive-piece tends to be returned by the return element.

By providing a blocking unit for holding the return element « armed », it is possible to eliminate the need for using a continuous supply of energy, such as a pressure force permanently exerted on the piston against the return force, in order to hold the drive-piece in the position opposite to that in which the drive-piece tends to be held by the return element.

Advantageously, the blocking unit comprises a block-piece, presenting a first bearing surface, the block-piece being movable between a blocking position, in which the first bearing surface bears against the drive member so as to block the drive member against the first side of the radial protrusion, and a release position, in which the first bearing surface is at a distance from the drive member so as to enable the free displacement of the drive member inside the radial bore, and an elastic return member for returning the block-piece in the blocking position.

Thus, blocking of the drive-piece is automatic. In other terms, no human action is necessary to block the drive-piece.

Advantageously, the block-piece comprises a second bearing surface against which is intended to bear the male portion during its insertion in the female portion, in order to displace the block-piece from the blocking position to the release position.

The advantage of this feature lies in an automatic release of the drive-piece, that is to say a release resulting from the set-up of the male portion on the female portion and from a beginning of insertion of the male portion in the female portion.

According to another possibility, the blocking unit comprises a source of energy linked to the actuation chamber of the connection system so as to make circulate in this actuation chamber a fluid intended to exert on the piston a pressure force opposite to and greater than a return force exerted by the return element on the drive-piece.

Thus, the system is simplified and the human effort is null since no start of insertion of the male portion in the female portion is necessary to trigger the release. All it needs is to position the male portion with respect to the female portion.

According to a preferred embodiment, the control unit comprises a sensor designed so as to generate a control signal in order to control an inlet or an outlet of a fluid inside the actuation chamber once the male portion is brought to bear against the female portion.

Thus, the generation of the control signal is automatic. No human action is necessary. All it needs is to position the male portion on the female portion so that the connection kinematics are triggered. This reduces the duration of execution of the connection operation.

According to one embodiment, the control unit comprises a push-button intended to control an inlet or an outlet of a fluid inside the actuation chamber.

This solution is more economical than a solution with a sensor.

According to a preferred embodiment, the cavity comprises an inclined sidewall forming with the horizontal a first angle α greater than 45° and the radial protrusion comprises an inclined sidewall opposite to the inclined sidewall of the radial protrusion and forming with the vertical a second angle β greater than 0°.

Thus, there is no clearance; no disconnection is possible by exerting a pull on the male portion. Only a displacement of the drive-piece, in particular the piston, from the connection position towards the disconnection position can release the male portion from the female portion.

If appropriate, a pull of the male portion results in the sidewall of the cavity transmitting to the drive member a reaction force basically with a radial component, so that the drive member is pressed against the inclined sidewall of the radial protrusion, this inclined plane opposing it to a reaction force with a vertical component opposing the displacement of the drive member. The drive member remains immobile, there is no clearance, and the disconnection is impossible, unless pushing the drive-piece upwards, towards the disconnection position, in order to clear out the drive member towards the cavity.

BRIEF DESCRIPTION OF THE DRAWINGS

Other features and advantages of the present invention will come out clearly from the following detailed description of embodiments of the invention, given as a non-limiting example, with reference to the appended drawings in which.

DETAILED DESCRIPTION

Figure 1:
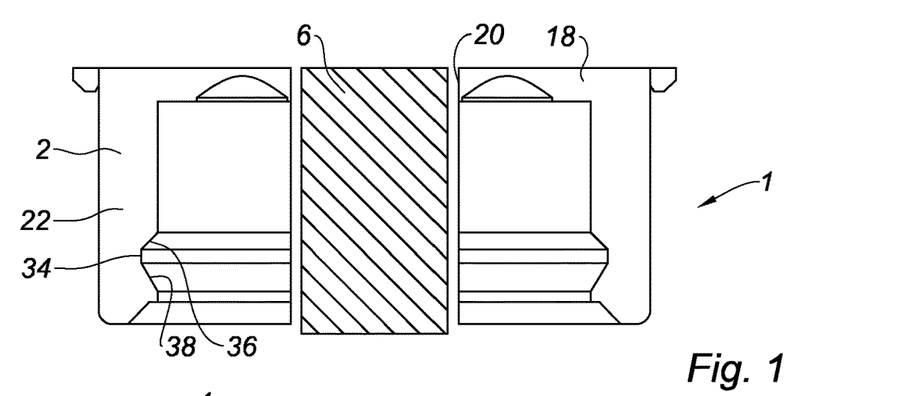
FIG. 1 is a schematic sectional view of a connection system according to one embodiment of the invention, the male portion and the female portion being disconnected.

FIG. 1 shows a connection system 1 according to one embodiment of the invention. The connection system 1 is intended to connect two devices, for example a bottom of a mold intended to the manufacture of vessels, in particular by blow-molding, and the support of this mold bottom, this support being also called saddle, while enabling a communication of a fluid, in particular a gas or a liquid, between these two devices.

Figure 18:
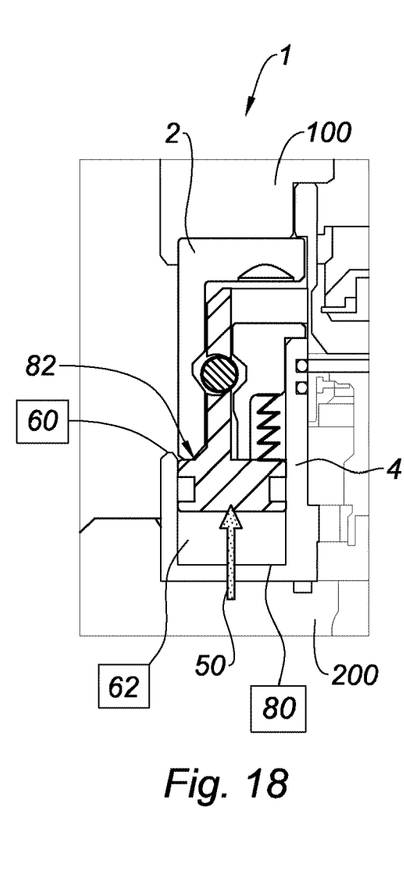
FIGS. 18 to 25 are schematic sectional views of a connection system according to another embodiment of the invention, illustrating different steps of the kinematics of connection of the male portion inside the female portion.
Figure 19:
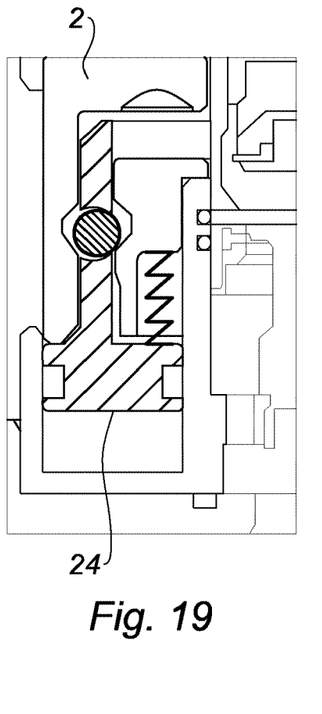
Figure 20:
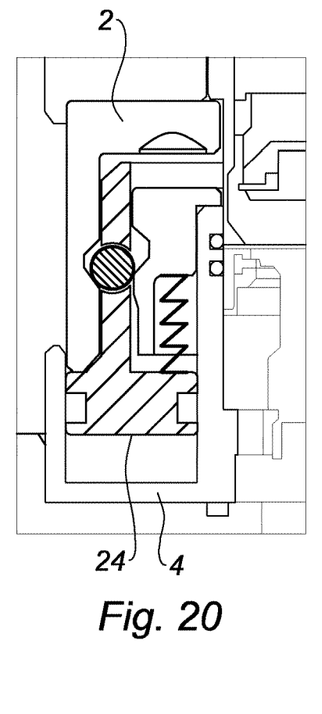

As is visible in FIG. 18, the connection system 1 comprises a male portion 2 which may be joined up to a first device 100 among these two devices, and a female portion 4 which may be joined up to a second device 200 among these two devices.

As is visible in FIG. 1, each of the male portion 2 and the female portion 4 may comprise a through conduit 6, the respective conduits 6 being intended to be arranged in the extension of each other when the male portion 2 and the female portion 4 are connected, in order to enable the transport of a fluid between the two devices joined up by the male and female portions. The conduits 6 may be arranged at the center of the male and female portions.

The female portion 4 may comprise a central tubular portion 8 delimiting the conduit 6, and an external tubular portion 10 linked to the central tubular portion 8 by a wall 12, in particular a bottom wall, so that the central tubular portion 8 and the external tubular portion 10 delimit an actuation chamber 14 therebetween. The actuation chamber 14 may comprise an orifice (not represented) for inlet or for outlet of a fluid.

According to the example illustrated in FIG. 1, the female portion 4 may comprise a guide-piece 16 arranged around the central tubular portion 8, between the central tubular portion 8 and the external tubular portion 10.

The male portion 2 may comprise, like in this instance, a bottom wall 18, in particular in the form of a disc, presenting at its center a hole 20 forming the conduit 6. A tubular skirt 22 extends from the bottom wall 18, in particular from a contour of the disc, delimiting a hollow space inside which it is intended to receive the guide-piece 16 and the central tubular portion 8.

The skirt 22 is intended to be inserted between the central tubular portion 8 and the external tubular portion 10, and more particularly between the guide-piece 16 and the external tubular portion 10.

The skirt 22, the guide-piece 16, the central tubular portion 8 and the external tubular portion 10 may be substantially cylindrical.

As can be seen in the figures, the female portion 4 comprises a drive-piece 24. This drive-piece 24 comprises a drawer portion 26 fitted with a radial bore 28.

The drawer portion 26 may be substantially cylindrical.

The drawer portion 26 is intended to slide between the male portion 2 and the central tubular portion 8, and more specifically herein between the skirt 22 and the guide-piece 16, between which the drawer portion 26 is interposed.

Figure 10:
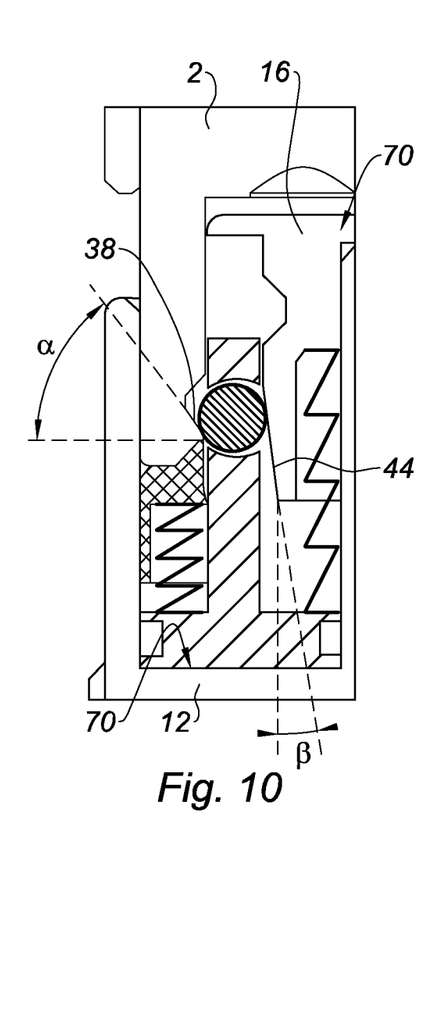
Figure 11:
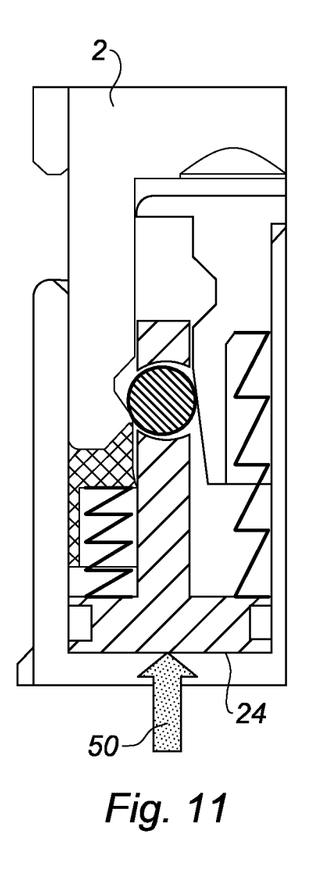
FIGS. 11 to 17 are schematic sectional views of a connection system according to one embodiment of the invention, illustrating different steps of the kinematics of disconnection of the male portion and the female portion.
Figure 12:
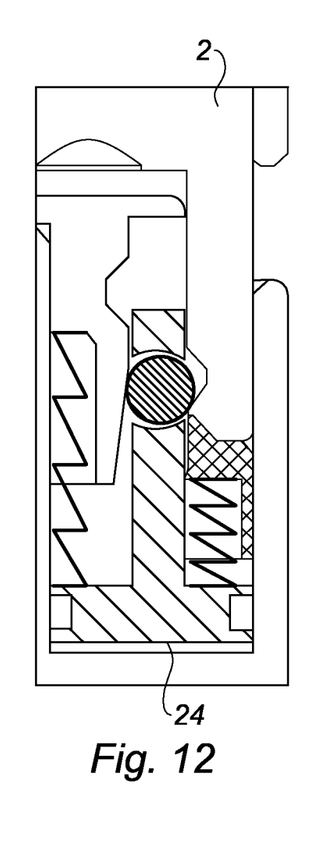
Figure 13:
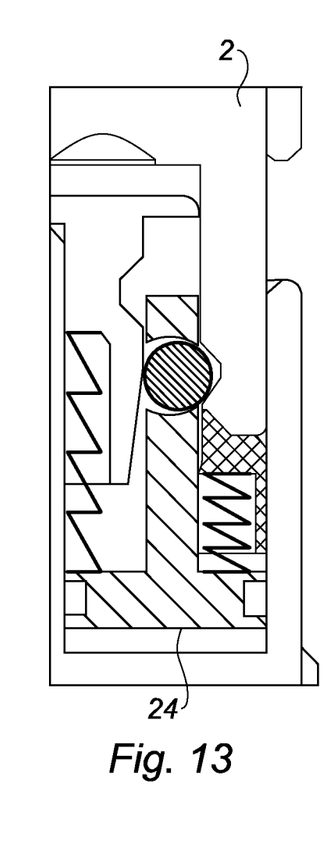
Figure 14:
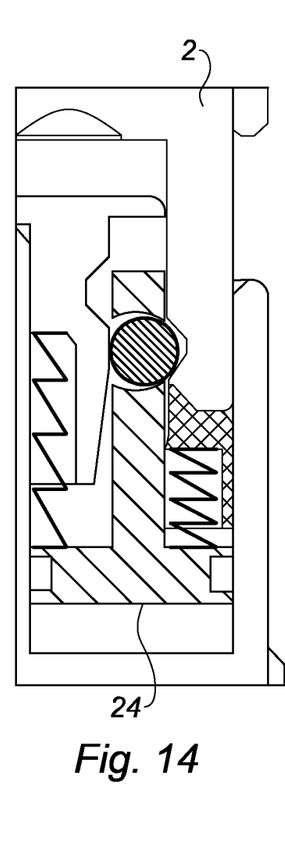
Figure 15:
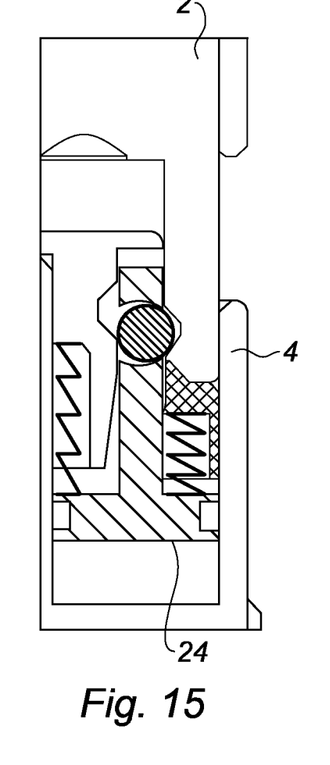
Figure 16:
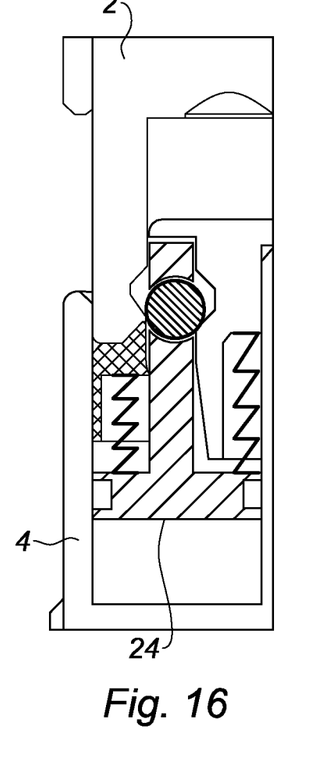
Figure 25:
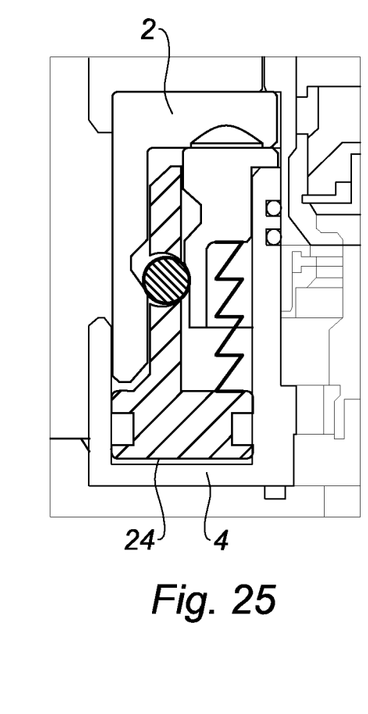

The drive-piece 24 is therefore movable in translation along an axis substantially parallel to the axis of insertion of the male portion 2 in the female portion 4, between a disconnection position, represented in FIGS. 1, 3, 17 and 18, in which the male portion 2 and the female portion 4 may be separated from each other, and a connection position, represented in FIGS. 10, 11 and 25, in which the male portion 2 and the female portion 4 are connected to each other, the male portion 2 being blocked inside the female portion 4.

The female portion 4 also comprises a drive member 30 arranged inside the radial bore 28. The radial bore 28 may comprise at one of its ends an abutment 32, visible in FIG. 26, for preventing the drive member 30 from being extracted from. The drive member 30 may present a dimension, for example a diameter, larger than the depth of the radial bore 28, that is to say larger than a thickness of the drawer portion 26. For example, the drive member 30 is a ball.

Figure 6:
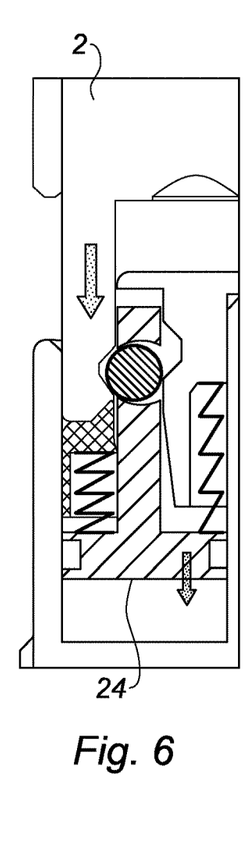
Figure 7:
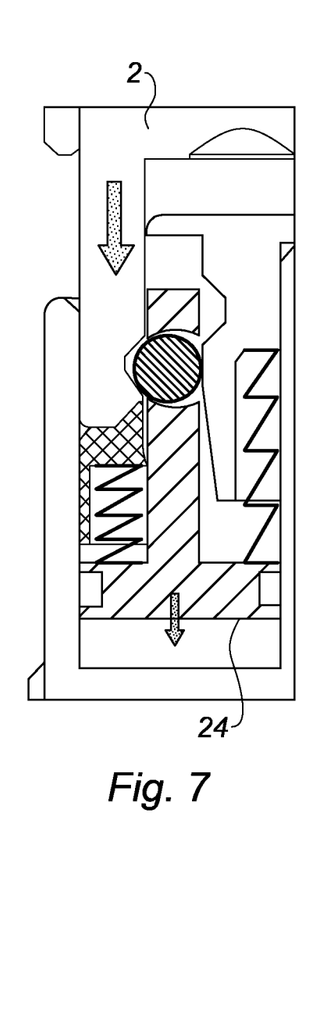
Figure 8:
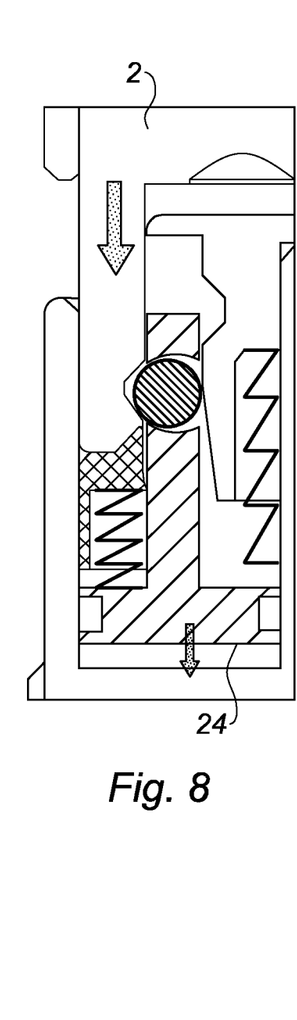
Figure 9:
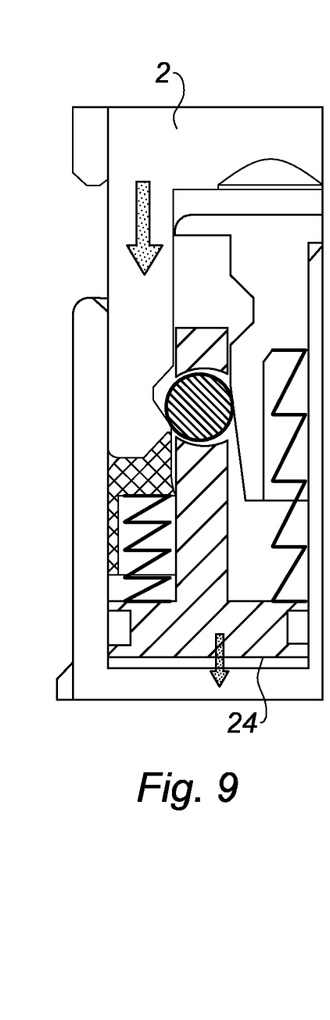
Figure 21:
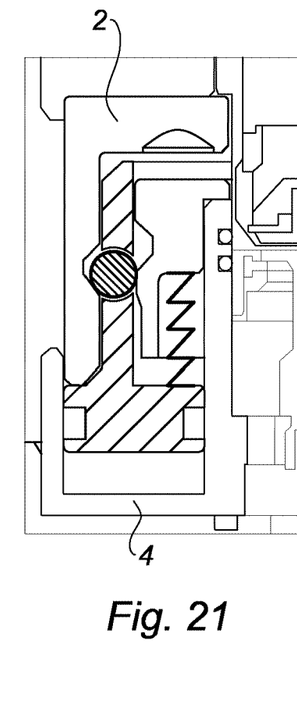
Figure 22:
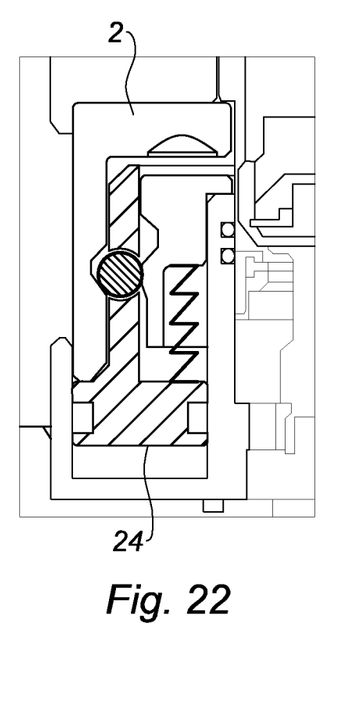
Figure 23:
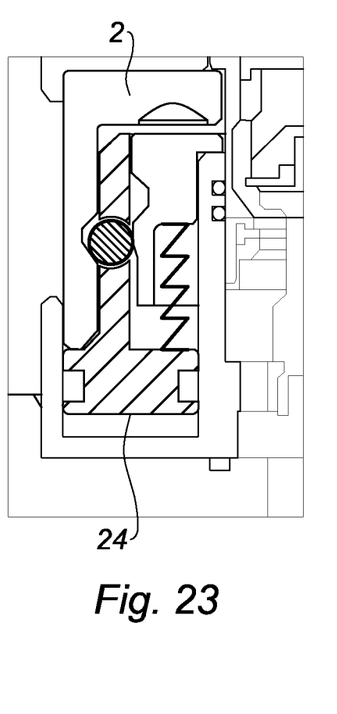
Figure 24:
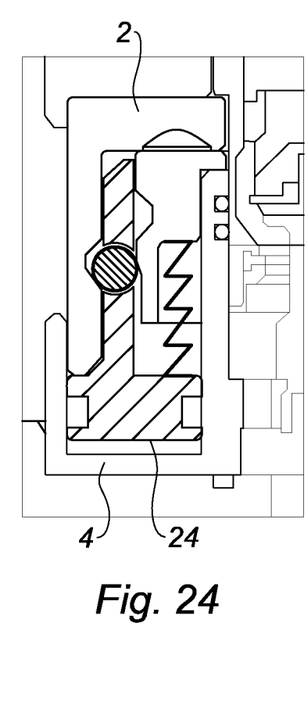

The drive member 30 is radially movable, in this instance substantially perpendicularly to the axis of insertion of the male portion 2 in the female portion 4, inside the radial bore 28, between an external position, represented in particular in FIGS. 6 and 21, in which the drive member 30 may bear against the abutment, and an internal position, visible for example in FIG. 18.

The male portion 2 herein comprises a cavity 34. This cavity 34 may comprise one or several sidewall(s) 36, 38 inclined with respect to the axis of insertion of the male portion 2 in the female portion 4, for example an upper sidewall 36 and a lower sidewall 38. The cavity 34 may be formed on one side, for example an inner side, of the skirt 22. For example, the cavity 34 may consist of a groove.

The female portion 4, in particular the guide-piece 16, comprises a radial protrusion 40, which may present two lateral sidewalls 42, 44, inclined with respect to the axis of insertion of the male portion 2 in the female portion 4. The radial protrusion 40 is intended to face the cavity 34 during the insertion of the male portion 2 in the female portion 4 or the extraction of the male portion 2 out of the female portion 4. The radial protrusion 40 is intended to clear out the drive member 30 in the cavity 34 during this insertion or extraction, that is to say during the translation of the drive-piece 24, so that the drive member 30 is brought to bear against a sidewall 36, 38 of the cavity 34.

The female portion 4, in particular the guide-piece 16, may comprise a second cavity 46, partially delimited by the radial protrusion 40.

When in the external position, the drive member 30 can extend in the cavity 34 of the male portion 2, whereas when in the internal position, the drive member 30 can extend in the second cavity 46 of the female portion 4.

Moreover, when in the disconnection position, the drive member 30 bears against a first side of the radial protrusion 40, and when in the connection position, the drive member 30 bears simultaneously against a sidewall 38 of the cavity 34 of the male portion 2 and a second side of the radial protrusion 40, in order to block the male portion 2 in the female portion 4.

As can be seen in the figures, the drive-piece 24 comprises a piston 48. The piston 48 is designed so as to slide in the actuation chamber 14, to which it conforms, under the effect of a pressure force, represented by the arrow 50 in FIGS. 11 and 18, generated by a fluid present in the actuation chamber 14.

The piston 48 is fastened to the drawer portion 26 so as to displace the drive-piece 24 towards one of the positions among the connection position and the disconnection position under the effect of the pressure force.

The piston 48 may present a housing 52, for example a groove, and a dynamic sealing gasket 54 arranged inside this housing 52.

The piston 48 may present an annular form, and extend around the central tubular portion 8.

The piston 48 extends in a plane substantially perpendicular to the axis of insertion of the male portion 2 in the female portion 4, so that the forces exerted by the piston 48 allow pulling or pushing the male portion 2 in or out of the female portion 4.

According to the example illustrated in FIG. 1, the piston 48 comprises a lower face 56 obturating the actuation chamber 14, and an upper face 58 from which extends the drawer portion 26.

The connection system 1 further comprises a control unit 61 for triggering the application of the pressure force on the piston 48.

The control unit may comprise a sensor 60, schematically represented in FIG. 18, designed so as to generate a control signal in order to control an inlet or an outlet of a fluid inside the actuation chamber 14 once the male portion 2 is brought to bear against to the female portion 4.

The control unit may comprise a push-button 62, schematically represented in FIG. 1 and in FIG. 18, intended to control an inlet or an outlet of a fluid inside the actuation chamber 14.

As can be seen in FIGS. 1 to 25, the connection system 1 advantageously comprises a return element designed so as to return the drive-piece 24 towards one of the positions among the connection position and the disconnection position, so that the translation of the drive-piece 24 under the action of said return force causes a simultaneous displacement of the male portion 2 relative to the female portion 4.

The return element may comprise a spring 64 adapted to return the drive-piece 24 in the connection position, as is illustrated in FIGS. 1 to 25. The spring 64 herein links the guide-piece 16 and the piston 48, in particular the upper face 58 of the piston 48.

The return element, in particular the spring 64, allows catching up the running clearance of the drive-piece 24 and the piston 48 to which it is associated. In so doing, the return element contributes to the repeatability of the relative positioning of the male and female portions along the axis of insertion of the male portion in the female portion.

Figure 26:
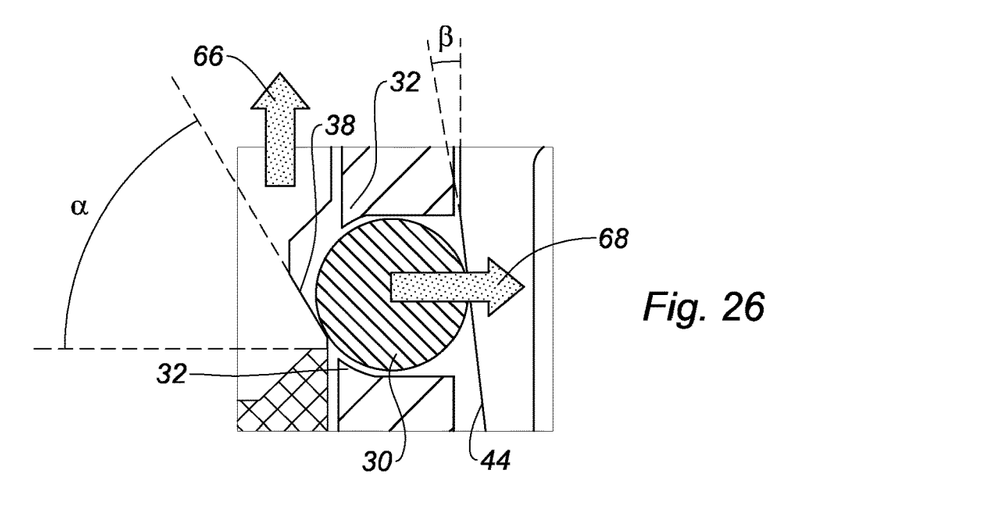
FIG. 26 is a detail of FIGS. 10 and 25.

As is visible in FIGS. 10 and 26, it will be noted that the lower inclined sidewall 38 of the cavity 34 of the male portion 2 advantageously forms with the horizontal a first angle α, greater than 45°, and that the lower inclined sidewall 44 of the radial protrusion 40 advantageously forms with the vertical a second angle β, greater than 0°, so that these inclined sidewalls 38, 44 are intended to substantially face each other when the drive-piece 24 is in the connection position.

Moreover, in the connection position, when the drive member 30 bears simultaneously against the lower inclined sidewall of the cavity 34 and the lower inclined sidewall of the radial protrusion 40, as is visible in FIGS. 10, 25 and 26, the radial bore 28 also exerts a pressure on the drive member 30 so as to hold the drive member 30 against the lower inclined sidewall 38 of the cavity 34.

Thus, there is no clearance for the drive member 30, which contributes to the repeatability of the relative positioning of the male and female portions along the axis of insertion of the male portion in the female portion. No disconnection is possible by exerting a pull on the male portion 2. Only a displacement of the drive-piece 24, in particular the piston 48, from the connection position towards the disconnection position can release the male portion 2 from the female portion 4, as will be described in more detail hereinafter.

A pull of the male portion 2, represented by the arrow 66 in FIG. 26, results in the lower sidewall 38 of the cavity 34 transmitting to the drive member 30 a reaction force basically with a radial component 68, so that the drive member 30 is pressed against the inclined sidewall 44 of the radial protrusion 40 instead of being displaced upwards.

In particular, the lower inclined sidewall 38 of the cavity 34 of the male portion 2 and the lower inclined sidewall 44 of the radial protrusion 40 may be substantially parallel, that is to say that the sum of the first and second angles α, β may be in the range of 90°.

It will also be noted that the lower sidewall 44 of the radial protrusion 40 is shaped so that, when in the connection position, a portion of the drive member 30 protrudes out of the radial bore 28 in order to block the male portion 2 in the female portion 4.

Moreover, the upper sidewall 42 of the radial protrusion 40 penetrates further in the female portion 4 than the lower sidewall 44 of the radial protrusion 40, so that when in the disconnection position, the drive member 30 bearing against the upper sidewall 42 does not protrude out of the radial bore 28 towards the male portion 2, which allows separating the male portion 2 from the female portion 4.

As is represented in FIG. 10, the connection system 1 may comprise an abutment surface 70 for stopping the stroke of the piston 48 or the stroke of the male portion 2 when the male portion 2 is driven in insertion in the female portion 4 by the drive-piece 24. This abutment surface 70 may be an upper surface of the guide-piece 16, against which is intended to bear a lower surface of the bottom wall of the male portion 2, or a surface of the bottom wall 12 of the female portion 4, against which the piston 48 may be intended to bear.

Advantageously, the connection system 1 may comprise a blocking unit designed so as to block the drive-piece 24 in one of the positions, among the connection position and the disconnection position, other than that in which the drive-piece 24 tends to be returned by the return element.

According to the examples illustrated in the figures, the return element tends to hold the drive-piece 24 in the connection position, whereas the blocking unit is adapted to hold the drive-piece 24 in the disconnection position.

Figures 2, 3:
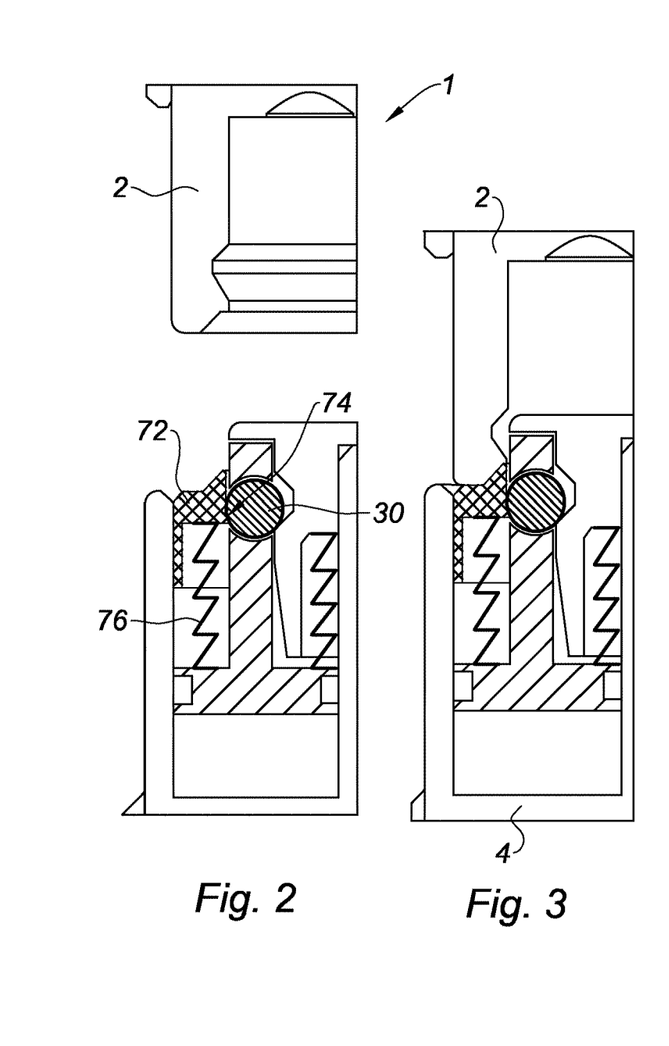
FIGS. 2 to 10 are schematic sectional views of a connection system according to one embodiment of the invention, illustrating different steps of the kinematics of connection of the male portion inside the female portion.

According to a first embodiment, visible in FIGS. 1 to 17, the blocking unit comprises a block-piece 72, presenting a first bearing surface 74, visible in FIG. 2, and an elastic return member 76, herein linking the block-piece 72 and the piston 48, in particular the upper face of the piston 48.

Figure 4:
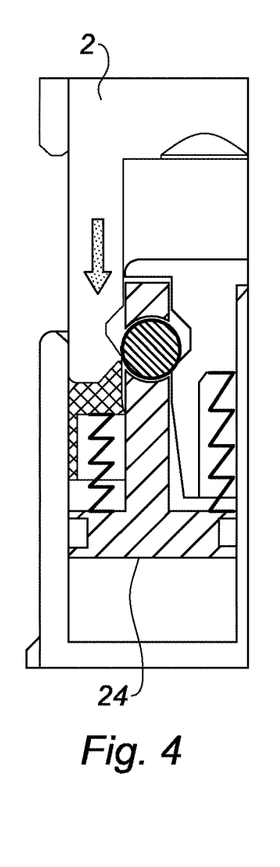
Figure 17:
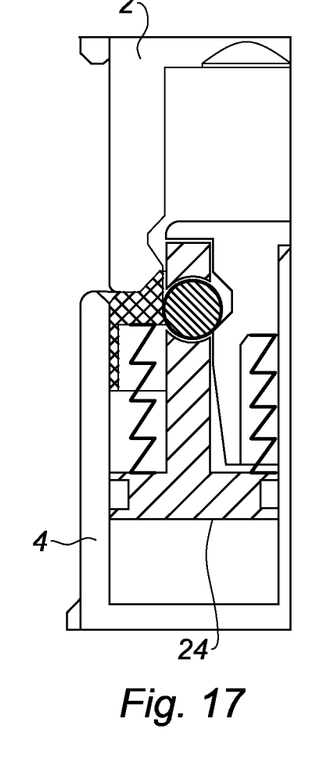

The block-piece 72 is movable between a blocking position, visible for example in FIGS. 1, 2 and 17, in which the upper bearing surface 74 faces the radial bore 28 and the first side of the radial protrusion 40, if appropriate of the second cavity 46, and bears against the drive member 30 which it therefore blocks against the first side of the radial protrusion 40, if appropriate in the second cavity 46, and a release position, visible for example in FIG. 4, in which the first bearing surface 74 is at a distance from the drive member 30 so as to enable the free displacement of the drive member 30 inside the radial bore 28.

The elastic return member 76 is adapted to return the block-piece 72 in the blocking position. For example, the elastic return member 76 is a spring.

Advantageously, the block-piece 72 may comprise a second bearing surface 78, against which is intended to bear the male portion 2, in particular an end of the skirt 22, during its insertion in the male portion 2, as is visible in particular in FIG. 3, so that the insertion of the male portion 2 in the female portion 4 displaces the block-piece 72 from the blocking position towards the release position, against the action of the elastic return member 76.

As can be seen in FIGS. 1 to 17, the block-piece 72 may be disposed between the external tubular portion 10 and the drive-piece 24, in particular the drawer portion 26 of the drive-piece 24.

The operation of the connection system 1 according to the embodiment represented in FIGS. 1 to 17 is described hereinafter, starting from an initial situation in which the male and female portions are disconnected (FIGS. 1 and 2). The drive-piece 24 is in the disconnection position, the radial bore 28 faces the second cavity 46, the drive member 30 is in the internal position, bearing against the upper sidewall of the radial protrusion 40, and does not surpass at the other side of the radial bore 28. The spring 64 is compressed. The block-piece 72 is in the blocking position and holds the drive member 30 bearing against the upper sidewall 42 of the radial protrusion 40, which also results in holding the drive-piece 24 in the disconnection position against the action of the spring 64.

The male portion 2 is first positioned on the female portion 4, and more specifically on the block-piece 72 (FIG. 3). The end of the skirt 22 is in contact with the second bearing surface 78 of the block-piece 72.

A user exerts a push on the male portion 2, in order to start the connection kinematics (FIG. 4).

Figure 5:
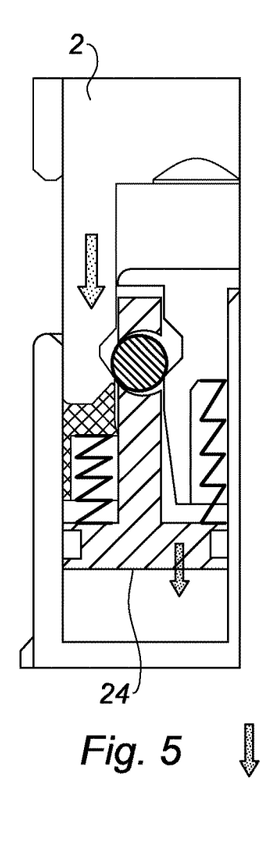

Consequently, the male portion 2 displaces the block-piece 72 (FIG. 5). The elastic return member 76 is compressed. The cavity 34 of the male portion 2 is displaced towards the drive member 30, the first bearing surface 74 stops holding the drive member 30 in the second cavity 46, the drive-piece 24 is released.

At this moment, the human effort which consisted in pushing the male portion 2 may stop; the connection becomes automatic, the drive-piece 24 is displaced towards the connection position under the effect of the return element.

In so doing, the drive-piece 24 drives the drive member 30 which is cleared out by the radial protrusion 40 in the cavity 34 of the male portion 2 (FIG. 6).

Consequently, the drive member 30 bears against the lower sidewall 38 of the cavity 34 of the portion, so that the force exerted by the return element is transmitted to the male portion 2, which is then driven towards the connection position (FIGS. 7 to 9), pulled by the drive-piece 24.

When the drive-piece 24 or the male portion 2 abuts against the abutment surface 70, their displacement stops (FIG. 10). The drive-piece 24 is in the connection position, the drive member 30 bears simultaneously against the lower sidewall 38 of the cavity 34, the lower sidewall 44 of the radial protrusion 40, and therefore, the male portion 2 is locked in the female portion 4 in a secure manner. A removal of the male portion 2 by pulling the male portion 2 is not possible, considering in particular the arrangement of the lower sidewalls 38, 44 of the cavity 34 and of the radial protrusion 40.

In order to disconnect the male portion 2 from the female portion 4, it is necessary to push the drive-piece 24 towards its disconnection position, against the action of the return element (see FIG. 11). This push may be carried out by means of a pressurized fluid in the actuation chamber 14. This fluid, for example compressed air, exerts a pressure force 50 on the piston 48 which drives the drive-piece 24 towards the disconnection position. The inlet of the pressurized fluid in the actuation chamber 14 is triggered by a command generated by the control unit, for example via the push-button 62.

In so doing, the drive member 30 is cleared out again in the cavity 34 of the male portion 2, where the drive member 30 is brought to bear against an upper sidewall 36 of the cavity 34, so that the male portion 2 is driven by the drive-piece 24, under the effect of the pressure force exerted by the piston 48, to which is added the pressure force of the elastic return member 76 pressing the second bearing surface 78 against the male portion 2 (FIGS. 12 to 17). The male portion 2 may be disconnected from the female portion 4.

According to a second embodiment, illustrated in FIGS. 18 to 25, the blocking unit comprises a source 80 of energy, for example a compressor, schematically represented in FIG. 18, this source 80 of energy being linked to the actuation chamber 14 of the connection system 1 so as to make circulate in this actuation chamber 14 a fluid, in particular air, intended to exert on the piston 48 a pressure force opposite to and greater than a return force exerted by the return element on the drive-piece 24.

FIGS. 18 to 25 show successive steps of the kinematics of connection of the male portion 2 and the female portion 4 of the connection system 1 according to this second embodiment.

These kinematics are similar to those described in relation to the first embodiment of FIGS. 1 to 17, except that the drive-piece 24 is initially held in the disconnection position (FIG. 18) by a pressure force 50 continuously exerted on the piston 48, by means of the source 80 of energy, against the action of the return element.

Once a control signal is generated by the control unit, this pressure forces stops being applied to the piston 48, so that the drive-piece 24 is displaced towards the connection position under the action of the return element, and pulls the male portion 2 until the male portion 2 is locked in the female portion 4, as has been described in relation to the first embodiment.

The control signal herein may be generated by the sensor 60, this sensor being capable of detecting the initial positioning of the male portion 2 against the female portion 4, in particular against a bearing surface 82 of the drawer portion 26, as illustrated in FIG. 18.

Thus, all it needs is to set the male portion 2 on the female portion 4 in order to trigger the connection kinematics.

The disconnection may be controlled by the actuation of the push-button 62, which controls the inlet of a pressurized fluid in the actuation chamber 14, so that a pressure force opposite to the return force causes the displacement of the drive-piece 24 from the connection position towards the connection position, while unlocking the male portion 2 and the female portion 4, as has been described for the first embodiment.

Thus, on the assumption that the first device is a mold bottom giving its shape to a vessel and that the second device is a saddle, it is possible to rapidly and safely interchange the mold bottom by disconnecting it and then connecting another different one, thanks to the automatic character of the kinematics of connection and disconnection of the male and female portions, that is to say without any human effort or with a limited human effort.

The present invention generally finds application in the connection and locking of hydraulic, pneumatic couplers and in the field of energy connectors.

Of course, the invention is not limited to the sole embodiment described hereinabove, this embodiment having been given only as example. Modifications are possible, in particular regarding the constitution of the various elements or by the substitution of technical equivalents, still without departing from the scope of the invention.

Thus, the drive member 30 may consist of a roller instead of a ball.

Thus, the return force exerted by the return element may be replaced with a pressure force exerted on the piston 48.

Thus, the spring 64 may be configured to return the drive-piece 24 in the disconnection position rather than the connection position, whereas the actuation chamber 14 and the piston 48 may be configured so that the piston 48 is displaced in the connection position by a pressure force.

The invention claimed is:

1. A connection system for connecting two devices with a fluidic communication between the two devices, the connection system comprising
   a male portion which may be joined up to a first device among the two devices, and a female portion, which may be joined up to a second device among the two devices,
   a drive-piece presenting a drawer portion fitted with a radial bore, and a drive member radially movable inside the radial bore,
   a cavity, arranged on one of the portions among the male portion and the female portion, and a radial protrusion, arranged on the other one of the portions among the male portion and the female portion,
   the radial protrusion being configured so as to clear out the drive member in the cavity during a translation of the drive-piece, in order to bring the drive member to bear against a sidewall of the cavity,
   the drive-piece being movable in translation along a direction substantially parallel to an axis of insertion of the male portion in the female portion, between a disconnection position in which the drive member bears against a first side of the radial protrusion and at a distance from the cavity so as to enable the disconnection of the male portion and the female portion, and a connection position in which the drive member bears against a second side of the radial protrusion and bears simultaneously against a sidewall of the cavity in order to block the male portion in the female portion, wherein the drive-piece comprises a piston configured so as to slide in an actuation chamber of the connection system under the effect of a pressure force exerted by a fluid on said piston, the piston being fastened to the drawer portion so as to displace the drive-piece towards one of the positions among the connection position and the disconnection position under the effect of said pressure force, the connection system further comprising a control unit for triggering the application of said pressure force on the piston, wherein the connection system comprises a return element configured so as to return the drive-piece towards one of the positions among the connection position and the disconnection position, so that the translation of the drive-piece under the action of said return force causes a simultaneous displacement of the male portion relative to the female portion, the connection system further comprising a blocking unit configured so as to block the drive-piece in one of the positions, among the connection position and the disconnection position, other than that in which the drive-piece tends to be returned by the return element, the blocking unit comprising a block-piece, presenting a first bearing surface, the block-piece being movable between a blocking position, in which the first bearing surface bears against the drive member so as to block the drive member against the first side of the radial protrusion, and a release position, in which the first bearing surface is at a distance from the drive member so as to enable the free displacement of the drive member inside the radial bore, and an elastic return member for returning the block-piece in the blocking position, wherein the block-piece comprises a second bearing surface against which is intended to bear the male portion during its insertion in the female portion, in order to displace the block-piece from the blocking position to the release position.

2. The connection system according to claim 1, wherein the return element comprises a spring adapted to return the drive-piece in the connection position.

3. The connection system according to claim 1, wherein the control unit comprises a sensor configured so as to generate a control signal in order to control the entry or the outflow of a fluid inside or outside the actuation chamber once the male portion is brought to bear against the female portion.

4. The connection system according to claim 1, wherein the control unit comprises a push-button intended to control an inlet or an outlet of a fluid inside the actuation chamber.

5. The connection system according to claim 1, wherein the cavity comprises an inclined sidewall forming with the horizontal a first angle greater than 45° and the radial protrusion comprises an inclined sidewall opposite to the inclined sidewall of the radial protrusion and forming with the vertical a second angle greater than 0°.

6. A connection system for connecting two devices with a fluidic communication between the two devices, the connection system comprising a male portion which may be joined up to a first device among the two devices, and a female portion, which may be joined up to a second device among the two devices, a drive-piece presenting a drawer portion fitted with a radial bore, and a drive member radially movable inside the radial bore, a cavity, arranged on one of the portions among the male portion and the female portion, and a radial protrusion, arranged on the other one of the portions among the male portion and the female portion, the radial protrusion being configured so as to clear out the drive member in the cavity during a translation of the drive-piece, in order to bring the drive member to bear against a sidewall of the cavity, the drive-piece being movable in translation along a direction substantially parallel to an axis of insertion of the male portion in the female portion, between a disconnection position in which the drive member bears against a first side of the radial protrusion and at a distance from the cavity so as to enable the disconnection of the male portion and the female portion, and a connection position in which the drive member bears against a second side of the radial protrusion and bears simultaneously against a sidewall of the cavity in order to block the male portion in the female portion, wherein the drive-piece comprises a piston configured so as to slide in an actuation chamber of the connection system under the effect of a pressure force exerted by a fluid on said piston, the piston being fastened to the drawer portion so as to displace the drive-piece towards one of the positions among the connection position and the disconnection position under the effect of said pressure force, the connection system further comprising a control unit for triggering the application of said pressure force on the piston, wherein the female portion comprises a central tubular portion delimiting a conduit, and an external tubular portion, and wherein the male portion comprises a tubular skirt configured to receive the tubular portion of the female portion, said skirt being intended to be inserted between the central tubular portion and the external tubular portion of the female portion.

7. The connection system according to claim 6, comprising a return element configured so as to return the drive-piece towards one of the positions among the connection position and the disconnection position, so that the translation of the drive-piece under the action of said return force causes a simultaneous displacement of the male portion relative to the female portion.

8. The connection system according to claim 7, wherein the return element comprises a spring adapted to return the drive-piece in the connection position.

9. The connection system according to claim 8, comprising a blocking unit configured so as to block the drive-piece in one of the positions, among the connection position and the disconnection position, other than that in which the drive- piece tends to be returned by the return element.

10. The connection system according to claim 7, comprising a blocking unit configured so as to block the drive-piece in one of the positions, among the connection position and the disconnection position, other than that in which the drive- piece tends to be returned by the return element.

11. The connection system according to claim 10, wherein the blocking unit comprises a source of energy connected to the actuation chamber of the connection system so as to make a fluid circulate in this actuation chamber, said fluid being intended to exert on the piston a pressure force that is opposite to and greater than a return force exerted by the return element on the drive-piece.

12. The connection system according to claim 6, wherein the control unit comprises a sensor configured so as to generate a control signal in order to control the entry or the outflow of a fluid inside or outside the actuation chamber once the male portion is brought to bear against the female portion.

13. The connection system according to claim 6, wherein the control unit comprises a push-button intended to control an inlet or an outlet of a fluid inside the actuation chamber.

14. The connection system according to claim 6, wherein the cavity comprises an inclined sidewall forming with the horizontal a first angle greater than 45° and the radial protrusion comprises an inclined sidewall opposite to the inclined sidewall of the radial protrusion and forming with the vertical a second angle greater than 0°.

15. The connection system according to claim 6, wherein each of the male portion and the female portion comprising a conduit, the respective conduits of said male and female portions being intended to be arranged in the extension of each other when the male portion and the female portion are connected, in order to enable the transport of a fluid between the two devices joined up by the male and female portions.

* * * * *